United States Patent Office 2,895,327
Patented July 21, 1959

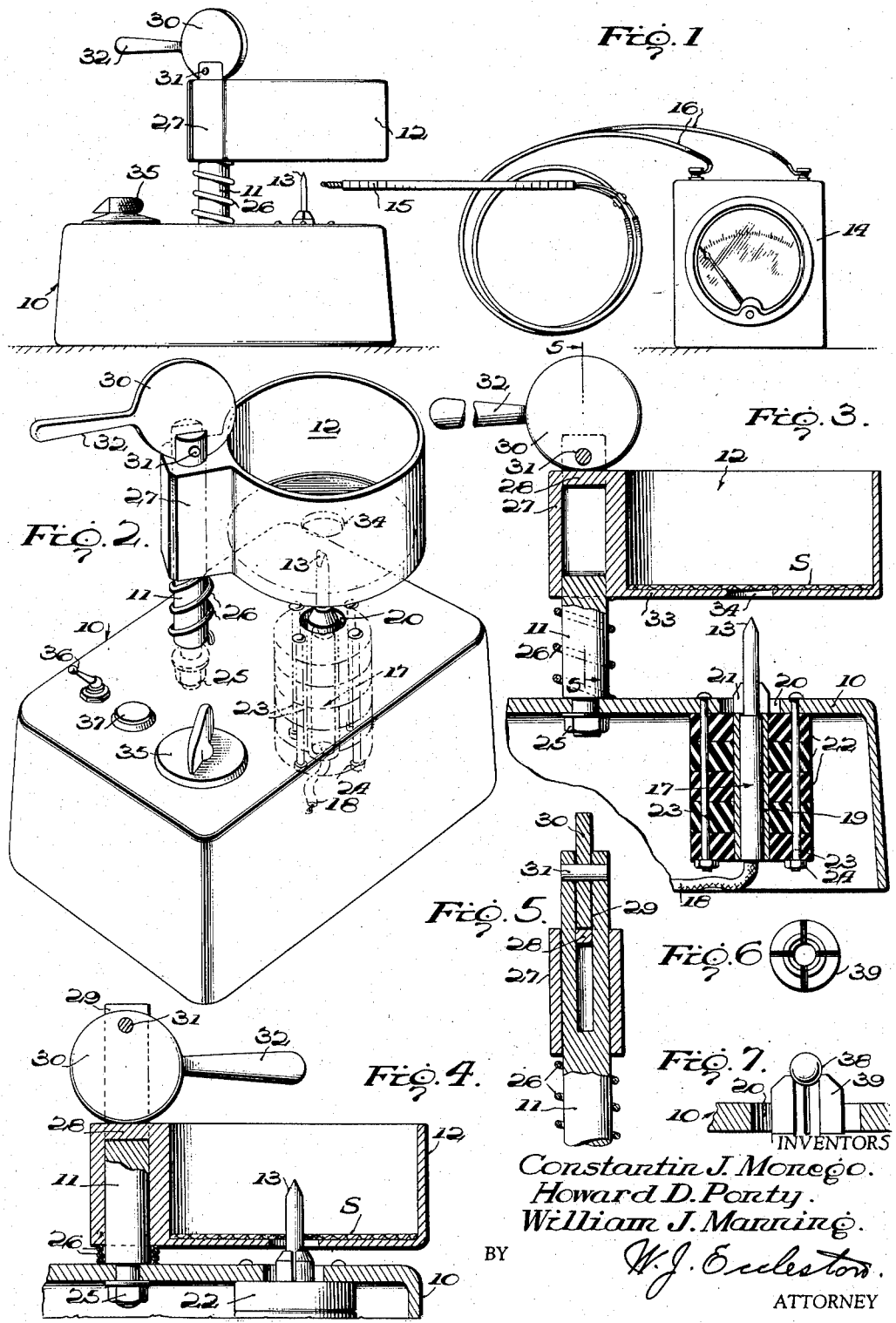

2,895,327

APPARATUS FOR MEASURING RESISTANCE OF FABRICS TO THERMAL DECOMPOSITION

Constantin J. Monego, Sherborn, William J. Manning, Natick, and Howard D. Ponty, Worcester, Mass., assignors to the United States of America as represented by the Secretary of the Army Application February 20, 1957, Serial No. 641,430

5 Claims. (Cl. 73—15)

(Granted under Title 35, U.S. Code (1952), sec. 266)

The invention described herein, if patented, may be manufactured and used by or for the Government for governmental purposes, without the payment to us of any royalty thereon.

The object of this invention is to provide apparatus which will cause thermal damage and decomposition of non-metallic fabrics, films and pellicles under controlled conditions, so that investigators may evaluate different specimens of the material under test. The particular purpose of the apparatus is to provide means for evaluating the resistance of textile fabrics to tobacco embers, which cause practically all the burn holes normally occurring in wearing apparel and automobile upholstery and seat covers. Our apparatus may also be of value in determining the effect of overheated pressing irons on different fabrics. Other objects and advantages of the invention will be understood from the following description of the preferred embodiment of the invention shown in the accompanying drawings forming a part of this specification.

In said drawings,

Figure 1 is an elevation of the apparatus shown with a conventional contact pyrometer;

Figure 2 is a perspective view of the apparatus;

Figure 3 is a fragmentary vertical sectional view showing a specimen in position for testing;

Figure 4 is a fragmentary vertical sectional view showing the specimen holder lowered and the specimen with a hole burned through it;

Figure 5 is a detail sectional view, the section being on line 5—5 of Figure 3;

Figure 6 is a detail plan view; and

Figure 7 is a sectional elevation showing a modification of the tip or upper specimen engaging end of the heating member.

Referring particularly to the drawings, the preferred apparatus comprises a stand or support 10, which may be placed on a table (not shown), a vertical post 11 fixed to and rising from stand 10, a specimen holder 12 movable up and down on post 11, and a stationary heated upright chisel tip 13 against which the specimen S, laid in holder 12, is moved when the test is made. A contact pyrometer 14 of conventional construction has a conventional thermocouple 15 connected thereto by insulated leads 16. The operator moves the end of thermocouple 15 into contact with the hot chisel tip 13 both before and after each test to be described, and each time the reading on the dial of the pyrometer is noted. As similar pyrometers are in wide use in many laboratories, no further description thereof will be presented.

The stand 10 may be molded from "Bakelite" or it may be of any other preferred material. A heater element 17, which may be a 75 w. cartridge heater, is supported on the underside of stand 10. Wires 18 connect the heater element 17 with a source of electricity as will be described. Cartridge heater 17 is supported within a hollow shell 19, preferably of brass, and the upper end of said shell projects through an aperture 20 in the top wall of stand 10. Slits 21 are cut in the shell's upper end to give a certain flexibility to permit frictional gripping of the chisel tip 13, yet permit manual removal of said tip for replacement when necessary. Brass shell 19 is surrounded by a series of stacked asbestos board rings 22 which are secured together and supported from the top of stand 10 by bolts 23 and nuts 24. Obviously other heat-insulating blocks or masses may be employed in lieu of asbestos rings 22, which serve to keep the stand 10 reasonably cool while a series of tests are being run, since most of the heat from the cartridge heater 17 is directed to the tip 13.

Vertical post 11 is rigidly secured to the top wall of stand 10 by means of a nut 25 screwed on the threaded lower end of the post: thus the post is really an extension of support 10. A coil spring 26 surrounds post 11 at its lower end and is supported by the top wall of the stand. A sleeve 27 (which is fixed to the specimen holder 12) is slidable on post 11 and is supported on the upper end of coil spring 26. Sleeve 27 has an integral guide bar 28 which extends horizontally and is slidable in a slot 29 cut in the upper end of post 11 and extending part way down the post. Guide bar 28 also serves as a follower for a cam 30 which lies in a vertical plane and is swingable on a pin 31 extending horizontally and transversely through the slotted upper end of post 11. The lower edge of cam 30 bears against follower 28 and the cam is swingable by a handle 32 from the position of Figures 1, 2 and 3 to the position shown in Figure 4. Coil spring 26 maintains the cam follower 28 constantly pressed against the lower edge of cam 30.

Specimen holder 12 is preferably a round bowl or basin open at the top and preferably of the same material as sleeve 27 so that the two parts may be cast or molded to be integral, or may be welded, brazed or soldered together to be substantially integral. Holder 12 has a flat bottom 33 with a circular aperture 34 at its center. A circular disk or specimen S of the fabric being tested is dropped into the open holder 12 to lie loosely on the bottom 33, covering the aperture 34, and thus the specimen is contacted by the hot chisel tip 13 when the holder 12 is lowered by swinging the cam clockwise, as the parts are viewed in the drawings.

The electrical circuit, not necessary to illustrate, includes a source of electricity, not shown, the heating cartridge 17, wires 18, a rheostat 35 (whose knob or handle is mounted on top of stand 10 and which may also have a scale, not shown), a toggle switch 36 likewise mounted, and a pilot lamp 37 also on stand 10 between switch 36 and the rheostat and showing by its light whether the heater is energized or de-energized.

Instead of a chisel tip 13, a ball tip 38 may be used, as shown in Figure 7. The ball tip may be a steel ball bearing resting on a milled seat in the top of a saddle piece 39 which is frictionally gripped in the slitted upper end of shell 19. The ball tip is advantageous because it is easily replaced when the charred fabric has soiled or adhered to the surface of the ball. A new ball tip may be used if desired for each test, to insure reproducible results. Other forms of heating tips and other materials than metal may be used. For example a porcelain or even a glass tip may apply heat to the specimen.

The operation of the apparatus will be fairly clear from the foregoing description. To start a test, the fabric specimen S is dropped into the specimen holder and the switch 36 is moved to "on" position. The temperature of the hot tip 13 or 38 is checked from time to time by holding the end of thermocouple 15 against it. The rheostat 35 may regulate this temperature, the preferred temperature for testing most fabrics being about 600° F. Then the cam is swung manually clockwise to move the specimen in the holder down until the hot tip contacts it as the tip enters aperture 34. After ten seconds, the cam is swung back to cause the specimen to be lifted from the hot tip. The surface temperature of the tip is again read on the pyrometer scale. If the temperature of the heating tip varies more than 10° from the preferred temperature during the total period of the test, the test run is ignored and the same procedure is repeated on a new specimen. The burnt or heat-damaged fabric is removed from the holder and is examined with the aid of a pick needle and the following conditions are noted:

(1) The area of the hole, if any.
(2) The area of the charred portion.
(3) The weakened or "near hole formation" area.

This weakened area is usually characterized by an embrittlement or partial charring of the fabric so that slight contact with the pick needle will cause disintegration. The average length and width of each area is measured with a pair of dividers and a scale having divisions of sixty-fourths of an inch.

Many modifications of the described structure and arrangement of parts may be made and some variations in the testing procedure may be resorted to. For instance, the heated tip could be made movable by the operator toward and from a fixed specimen holder. Also, the movable member could be actuated by foot power instead of by a handle. Other variations and modifications will readily occur to those skilled in the art.

What we claim is:

1. Apparatus for testing materials for their resistance to elevated temperatures comprising, in combination, a support; a vertical post fixed to the support; a coil spring supported by said support on the lower end of the vertical post; a specimen holder movable up and down on the post and compressing said spring as it moves toward the support; a cam movably mounted upon said vertical post and having a handle for moving it; a cam follower secured to the specimen holder; the cam when swung by its handle causing the specimen holder to move toward the support; and a heated tip fixed to the support in such position that it will be contacted by a specimen on said holder.

2. The invention defined in claim 1, wherein the upper end of the post is slotted and the slot thereof receives part of the cam follower, the cam also being partly received in said slot; said specimen holder being fixed to the cam follower and said coil spring supporting the specimen holder through the cam follower.

3. Apparatus for testing fabrics for their resistance and reaction to exposure to elevated temperatures comprising, in combination, a support; a holder for a specimen of the fabric to be tested; a heated tip of known temperature projecting upwardly from the support; the heated tip and the specimen holder being relatively movable by the operator so that the heated tip may be brought into contact with a specimen supported on the holder; and a saddle-like member projecting above the support, said tip being a metal ball resting on the saddle-like member and being located adjacent a source of heat.

4. Apparatus for testing fabrics for their resistance and reaction to exposure to elevated temperatures comprising, in combination, a support; a holder for a specimen of the fabric to be treated; a heated tip of known temperature projecting upwardly from the support and stationary thereon; the heated tip and the specimen holder being relatively movable by the operator so that the heated tip may be brought into contact with a specimen supported on the holder and the specimen holder being located directly above said tip; operator-actuated means for moving the holder down toward the tip to bring the specimen into contact with the heated tip; and operator-actuated means for controlling the temperature of said tip, said holder having a flat bottom wall, upright side walls, and being open at the top and closed at the flat bottom except for a hole therein of sufficient size whereby to admit the upper end of the heated tip.

5. Apparatus for testing materials for their resistance to elevated temperatures comprising, in combination, a support; a vertical post fixed to the support; a coil spring supported by said support on the lower end of the vertical post; a specimen holder movable up and down on the post and compressing said spring as it moves toward the support; movable means carried by the upper end of the post and engaging the specimen holder for moving it downward on said post; and a heated tip attached to the support in such position that it will be contacted by a specimen on said specimen holder.

References Cited in the file of this patent
UNITED STATES PATENTS
2,535,830    Beck  ------------------ Dec. 26, 1950